(12) United States Patent
Wakayama

(10) Patent No.: US 6,871,321 B2
(45) Date of Patent: Mar. 22, 2005

(54) SYSTEM FOR MANAGING NETWORKED INFORMATION CONTENTS

(76) Inventor: Toshihiro Wakayama, Ko 35, Oaza Ichinoe, Yamato-machi, Minamiuonuma-gun, Niigata-ken (JP)

( * ) Notice: Subject to any disclaimer, the term of this patent is extended or adjusted under 35 U.S.C. 154(b) by 758 days.

(21) Appl. No.: 09/811,627

(22) Filed: Mar. 20, 2001

(65) Prior Publication Data

US 2001/0027458 A1 Oct. 4, 2001

(30) Foreign Application Priority Data

Mar. 29, 2000 (JP) ........................................ 2000-091455

(51) Int. Cl.[7] .......................... G06F 15/00; G06F 17/00
(52) U.S. Cl. .................... 715/513; 715/501.1; 715/513; 715/514; 715/522; 715/523
(58) Field of Search .......................... 715/500.1, 501.1, 715/513, 514, 522, 523; 709/231, 232; 707/101, 104.1, 1–7

(56) References Cited

U.S. PATENT DOCUMENTS

| | | | |
|---|---|---|---|
| 6,175,843 B1 * | 1/2001 | Muramoto et al. | 715/513 |
| 6,285,999 B1 * | 9/2001 | Page | 707/5 |
| 6,554,263 B2 * | 4/2003 | Takashima et al. | 267/140.13 |
| 6,574,747 B2 * | 6/2003 | Ginsberg | 714/8 |
| 6,654,742 B1 * | 11/2003 | Kobayashi et al. | 707/7 |
| 6,718,367 B1 * | 4/2004 | Ayyadurai | 709/206 |
| 6,745,224 B1 * | 6/2004 | D'Souza et al. | 709/202 |
| 2001/0049682 A1 * | 12/2001 | Vincent et al. | 707/100 |
| 2002/0035592 A1 * | 3/2002 | Wu et al. | 709/202 |

OTHER PUBLICATIONS

Terrence Poon et al., Efficient Encoding of XML Updates, IBM Research Division, (presented at the T.J. Watson Research Center on Aug. 20, 1999).*

* cited by examiner

*Primary Examiner*—Joseph Feild
*Assistant Examiner*—Paul Nguyen-Ba
(74) *Attorney, Agent, or Firm*—Wenderoth, Lind & Ponack, L.L.P.

(57) ABSTRACT

A computer-implemented system for managing a collection of Web documents with dependency relationships which are defined among designated elements of those Web documents. The system automatically and consistently propagates updates that are introduced in such elements to all elements that directly or indirectly depend on those updated elements. The user interface of the system is realized as a collection of port complexes which are networked over the Web so that a collection of human or computer-based tasks which are distributed geographically and/or organizationally can be coordinated effectively through the dissemination of the right information at the right time in the Web environment.

7 Claims, 13 Drawing Sheets

Fig. 1

"FatherInfo" Content File

```
<?xml version="1.0" standalone="yes">
<!-- file name :   FatherInfo.xml -->
<FatherInfo   DateUpdated= "February 1, 2000" >
        <Name>
        Yoichiro Sato
        </Name>
        <Work>
                <CompanyName>
                ABC Paper Mill
                </CompanyName>
                <CompanyAddress>
                3-5 Uchisaiwai-cho, Niigata
                </CompanyAddress>
                <CompanyTelephone>
                025 432 3221
                </CompanyTelephone>
                <FatherContactAtWork   Cname= "C1" >
                        <DirectPhone>
                        025 432 3229
                        </DirectPhone>
                        <Secretary>
                                <SecretaryName>
                                Ken Morita
                                </SecretaryName>
                                <SecretaryPhone>
                                025 432 3231
                                </SecretaryPhone>
                        </Secretary>
                </FatherContactAtWork>
        </Work>
        <AnnualSalary   Cname= "C2" >
        10,000,000
        </AnnualSalary>
</FatherInfo>
```

Fig. 2

"MotherInfo" Content File

```
<?xml version="1.0" standalone="yes">
<!-- file name :   MotherInfo.xml-->
<MotherInfo>
        <Name>
        Keiko Sato
        </Name>
        <Work>
                <CompanyName>
                IROHA Bakery
                </CompanyName>
                <CompanyAddress>
                12-8 Terao-cho Niigata
                </CompanyName>
                <CompanyTelephone>
                025 876 1453
                </CompanyTelephone>
                <MotherContactAtWork   Cname= "H1" >
                        <DirectPhone>
                        025 876 1458
                        </DirectPhone>
                        <EmergencyNumber>
                        025 876 1450
                        </EmergencyNumber>
                </MotherContactAtWork>
        </Work>
        <AnnualSalary   Cname= "H2" >
        8,000,000
        </AnnualSalary>
</MotherInfo>
```

Fig. 3

"SatoBookkeeping" Content File

```
<?xml version="1.0" standalone="yes">
<!-- filename : SatoBookkeeping.xml -->
<SatoBookkeeping>
    <AnnualIncome  Cname= "Z" >
    </AnnualIncome>
    <AnnualExpense>
        <Food>
        </Food>
        <HousingLoan>
        </HousingLoan>
        <Miscellaneous>
        </Miscellaneous>
    </AnnualExpense>
</SatoBookkeeping>
```

Fig. 4

"SatoTelephoneDirecory" Content File

```
<?xml version="1.0" standalone="yes">
<!-- file name :   SatoTelephoneDirectory.xml  -->
<SatoTelephoneDirectory>
        <Home>
        025 634 9120
        </Home>
        <Work  Cname= "W"  >
        </Work>
</ SatoTelephoneDirectory>
```

Fig. 5

"SatoBookkeeping" Content File
After execution of the dependency clause [ Z, (C2, H2), C2+H2 ]:

```
<?xml version="1.0" standalone="yes">
<!-- filename : SatoBookkeeping.xml -->
<SatoBookkeeping>
    <AnnualIncome Cname= "Z" >
    18,000,000
    </AnnualIncome>
    <AnnualExpense>
        <Food>
        </Food>
        <HousingLoan>
        </HousingLoan>
        <Miscellaneous>
        </Miscellaneous>
    </AnnualExpense>
</SatoBookkeeping>
```

*Fig. 6*

"SatoBookkeeping" Constraint File

```
<?xml version="1.0" standalone="no" ?>
<!DOCTYPE Constraints SYSTEM "http://www.iuj.ac.jp/xml/Constraints.dtd">
<Constraints>
        <Target docURL="http://www.iuj.ac.jp/xml/SatoBookkeeping.xml">
        SatoBookkeeping
        </Target>
        <Reference docURL="http://www.iuj.ac.jp/xml/FatherInfo.xml">
        FatherInfo
        </Reference>
        <Reference docURL="http://www.iuj.ac.jp/xml/MotherInfo.xml">
        MotherInfo
        </Reference>
        <Definition>
                <Cvariable>   Z   </Cvariable>

<math>
                        <apply>
                                <plus/>
                                <ci> C2 </ci>
                                <ci> H2 </ci>
                        </apply>
                </math>
        </Definition>
</Constraints>
```

Fig. 7

"SatoTelephoneDirecory" Content File
After execution of the dependency clause [ W, (C1, H1), buildTree(C1, H1) ]

```xml
<?xml version="1.0" standalone="yes">
<!-- file name :   SatoTelephoneDirectory.xml  -->
<SatoTelephoneDirectory>
        <Home>
        025 634 9120
        </Home>
        <Work   Cname= "W" >
                <FatherContactAtWork   Cname= "C1" >
                        <DirectPhone>
                        025 432 3229
                        </DirectPhone>
                        <Secretary>
                                <SecretaryName>
                                Ken Morita
                                </SecretaryName>
                                <SecretaryPhone>
                                025 432 3231
                                </SecretaryPhone>
                        </Secretary>
                </FatherContactAtWork>

<MotherContactAtWork   Cname= "H1" >
                        <DirectPhone>
                        025 876 1458
                        </DirectPhone>
                        <EmergencyPhone>
                        025 876 1450
                        </EmergencyPhone>
                </MotherContactAtWork>
        </Work>
</SatoTelephoneDirectory>
```

Fig. 8

"SatoTelephoneDirecory" Constraint File

```
<?xml version="1.0" standalone="no" ?>
<!DOCTYPE Constraints SYSTEM "http://www.iuj.ac.jp/xml/Constraints.dtd">
<Constraints>
        <Target docURL="http://www.iuj.ac.jp/xml/SatoTelephoneDirectory.xml">
        SatoTelephoneDirectory
        </Target>
        <Reference docURL="http://www.iuj.ac.jp/xml/FatherInfo.xml">
        FatherInfo
        </Reference>
        <Reference docURL="http://www.iuj.ac.jp/xml/MotherInfo.xml">
        MotherInfo
        </Reference>
        <Definition>
                <Cvariable >   W   </Cvariable>
                <math>
                        <apply>
                                <buildTree/>
                                <ci> C1 </ci>
                                <ci> H1 </ci>
                        </apply>
                </math>
        </Definition>
</Constraints>
```

Fig. 9
Content Nets: an Example
- The set of content files : {a, b, c, d}
- Constraint File in which dependency relationships are separated from contents.
$$a.y = F_1(a.x, a.z, c.x)$$
$$a.z = F_2(b.z)$$
$$b.x = F_3(a.x, a.y)$$
$$b.y = F_4(d.x)$$
$$b.z = F_5(b.y)$$
$$c.x = F_6(c.y, d.y)$$
$$d.x = F_7(c.y, c.y)$$
$$d.y = F_8(d.z)$$
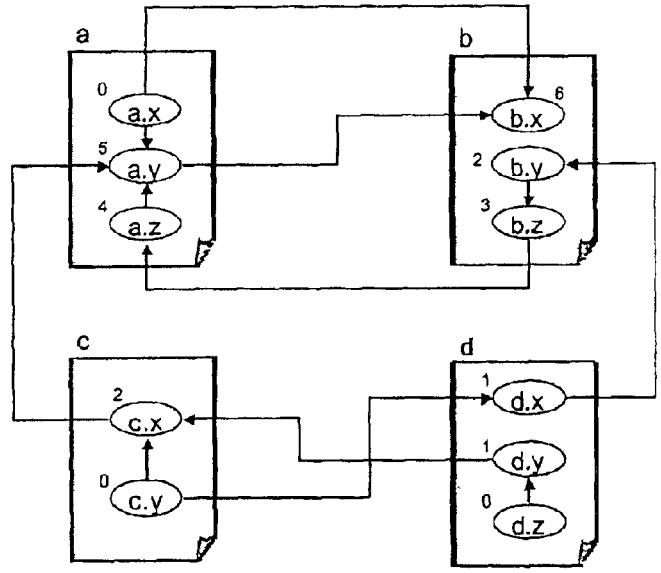
Notes:
 : Web documents
○ : Active elements
a.x, a.y, ... d.y, d.z : Element identifiers
a.x, c.y, d.z : Initial elements

SYSTEM FOR MANAGING NETWORKED INFORMATION CONTENTS

BACKGROUND OF THE INVENTION

1. Field of the Invention

The present invention relates to a computer-implemented system that supports the effective coordination of geographically and/or functionally distributed human tasks (i.e., operations, processes, and decision making, etc.) as well as computer-programmed tasks by developing and managing, over the Web, networked information contents that support those tasks.

2. Prior Art

Information contents which are constructed and viewed on the Web are represented in Web-standard languages such as HTML (Hyper Text Markup Language) and XML (Extensible Markup Language). Units of information that are written in such languages are called "Web documents". The most important characteristics of Web documents are their ability for information contents in these documents to be decomposed in a tree-like hierarchical structure, and for each component in such a decomposition to have a semantic description and attributes through a syntactic construct called a "tag". While tags in HTML are for layout interpretation only and not extensible, tags in XML are extensible and can accept any interpretations which the user defines. In HTML and XML, information contents that can be identified as decomposed components via tags are called "elements".

With reference to FIG. 1 below, we will illustrate elements and their hierarchical structure in XML. In FIG. 1, the part <CompanyName>ABC Paper Mill </CompanyName>, for instance, is an example of element. <CompanyName>is an open tag, and </CompanyName>is a closed tag. An element can have its own internal tree structure, and an element can contain another element therein. In this case, the latter element is called a "sub-element" of the former. For instance, in FIG. 1, the part beginning with the open tag <Work>and ending with the closed tag </Work>is an example of an element having its own internal structure. Elements such as <CompanyName>ABC Paper Mill </CompanyName>and the part beginning with <FatherContactAtWork Cname="C1">and ending with </FatherContactAtWork>are examples of sub-elements of the <Work>element. Furthermore, the <FatherContactAtWork Cname="C1">sub-element has its own sub-elements such as <DirectPhone>025 432 3229</DirectPhone>. A sub-element of a sub-element of an element is also a sub-element of this element. For instance, <DirectPhone>025 432 3229</DirectPhone>is also a sub-element of the <Work>element. In XML, various attributes can be defined for the elements. More specifically, an attribute can be defined for an element in its open tag in the form Attribute Name "Attribute Value". In FIG. 1, through the open tag <FatherInfo DateUpdated= "Feb. 1, 2000">, the "FatherInfo" element is given an attribute, "DateUpdated", and its value, "Feb. 1, 2000".

Web-standard languages such as HTML support "links" that relate elements of Web documents, and a network of information contents can be developed via such links. Moreover, XML and its related standards such as XLinks support linking capabilities which are far superior to those that are offered in HTML.

However, links are a mechanism for moving from one piece of information content to another, and are not intended to capture "dependency relationships" that might exist between such pieces of information contents. A critical difference between links and dependency relationships is that in dependency relationships, there is the notion of "interpretation" between related pieces of information contents. For instance, an engineer who is responsible for the development of a product is likely to have a certain specific use of sales data pertaining to the product. Thus, it is desirable to analyze and customize the sales data for his intended use. If this analysis and customization can be captured computationally, the customized data functionally depends on the original sales data. It is not possible to directly represent such dependency relationships by using linking mechanisms of Web-standard languages such as XML or XLinks.

Currently, such dependency relationships are represented by using programming languages such as Java or scripting languages such as Java Script (from here on, we use the term "programming languages" to refer to scripting languages as well).

However, there are several problems and difficulties which are associated with representing dependency relationships by using programming languages. For instance:

Representational Independence: When precise representations of dependency relationships depend on particular programming languages, their representational independence from specific implementations is difficult to maintain. If the deployed programming language changes, the existing representations of dependency relationships may possibly become invalid.

Sharing: One must know a specific programming language sufficiently well in order to understand the precise definitions of dependency relationships that are given in the programming language. It is difficult to share dependency relationships and organizational knowledge which is captured in such dependency relationships.

Flexibility in maintaining and managing existing dependency relationships: Once dependency relationships get coded in a programming language, it will be more difficult to adjust and modify the dependency relationships, and, consequently, the resulting information system tends to be rigid.

Uniformity: Since there is no established, uniform representation format for dependency relationships, it is difficult to maintain uniformity in the representation of dependency relationships, and hence, it is also difficult to evaluate a chain of multiple dependency relationships. For instance, suppose we have information contents A, B and C. If we have different representation formats for a dependency relationship from A to B and another dependency relationship from B to C, we would have to have multiple evaluation environments, and it would be more difficult to evaluate the chain of relationships from A to C (via B) without interruptions.

Consistency: When no uniform representation format is established for dependency relationships, it will be difficult to maintain the consistency of entire information contents which are networked through such relationships. More precisely, the difficulty is with the consistent propagation of updates throughout the dependency chain of information contents whenever a change occurs in some part of the networked information contents.

Now, we shift to the issue of interface for editing and viewing information contents over the Web. The notion of a "port" as a relay point or interface for information interchange has been around for a long time. For instance, a telephone is an example of a port, as well as email over the Internet. These are a kind of "general-purpose" ports in the sense that they receive unspecified information from unspecified sources. In contrast, with the advent of the Web, it is becoming increasingly feasible to construct ports that are specialized for particular needs. For instance, a company may have Web pages that are customized for individual clients, through which each client can obtain customized information or send his own order inquiries. These are beginning examples of "special-purpose" ports.

However, as the intended use of a port gets more specialized, so does the role of the port within the entire context of a task that the user of the port is expected to accomplish. In such cases, the user would have to have a collection of special-purpose ports to complete his task. However, a framework for organizing a collection of related ports that are intended to support a complete task has not been developed yet. For instance, a product development engineer, as in the example above, might need a port for receiving sales information from the sales department, a port for receiving information on production process from production lines, and also a port for sending information to production lines. We would need a framework for managing such a collection of ports as a coherently organized "port complex", with its coherence stemming from the fact that all of these ports are intended to support a common task collectively.

At this point, the idea of building a port complex over the Web has not been systematically developed. The present practice of information interchange over the Web for the purpose of coordinating organizational tasks has the following technical difficulties and problems:

Layout discontinuity of related ports: For instance, in the case of placing orders over the Web, the port for sending orders and the port for receiving order confirmations should reside in the same port complex as they serve the same task of order-placing. However, in most cases, these two ports are represented as separate Web documents, and hence, the user needs to go back and forth between multiple documents in order to complete his task. In other words, the layout continuity of use-wise related ports has not been well established. The layout and operational "distance" between related ports should solely depend on the amount of information being presented in those ports.

Ineffective, mixed representation of related ports: A port complex has several aspects or features. They are, for instance, information contents in the complex, types of ports in the complex, input and control functions of ports, and the layout of the complex. If HTML is used to build a port complex, all of these aspects or features will be mixed in one file, and people with HTML knowledge would have to deal with all of those aspects or features. Obviously, this is not a very effective way of building a port complex. XML, on the other hand, separates information contents from layout presentation, and hence, port layout can be specified in a separate file by using a layout specification language such as XSL (Entensible Style Language). Even in a XML representation of a port complex, however, unless those aspects or features are well distinguished at least conceptually, disadvantages of HTML-based development would still persist.

SUMMARY OF THE INVENTION

An overall objective which is addressed by the present invention is to construct a network of information contents including their dependency relationships over the Web and to realize a mechanism of update propagation throughout the network so that a collection of human or computer-based tasks which are distributed geographically and/or organizationally can be coordinated effectively through the dissemination of the right information at the right time over the Web. A more specific objective of the present invention is to improve the way in which dependency relationships of information contents are represented by establishing representational uniformity, representational independence from specific programming languages, ease of sharing the dependency relationships as an organizational resource, and an increased flexibility in modifying dependency relationships. Another more specific objective of the present invention is to maintain the consistency of information contents of the entire network through an uninterrupted execution of update propagation and management. Another more specific objective of the present invention is to improve the efficiency of update propagation by analyzing the dependency structure of information contents prior to the propagation. Anther overall objective of the present invention is to construct, over the Web, a port complex, i.e., a collection of related ports for receiving and sending information. A more specific objective of the present invention is to remove unnecessary inter-port "distances" that result from the current practice of implementing ports in which contents of separate ports, even when they are use-wise related, are represented in different Web documents. Another more specific objective of the present invention is to improve the efficiency of port complex construction by distinguishing and separately defining different aspects or features of a port complex. Another more specific objective of the present invention is to develop, over the Web, a networked collection of port complexes on top of a collection of information contents which are networked through their dependency relationships.

BRIEF DESCRIPTIPON OF THE DRAWINGS

FIG. 1 is an example of a content file in which some content variables are declared;

FIG. 2 is another example of a content file in which some content variables are declared;

FIG. 3 is an example of a content file in which functional dependent variables are declared;

FIG. 4 is another example of a content file in which functional dependent variables are declared;

FIG. 5 is an example of a content file after execution of the definition of a functional dependent variable;

FIG. 6 is an example of a constraint file;

FIG. 7 is another example of a content file after execution of the definition of a functional dependent variable;

FIG. 8 is anther example of a constraint file;

FIG. 9 is an example of a content net in which dependency relationships among elements are specified in a single file which is separate from Web documents representing information contents;

DETAILED DESCRIPTION OF THE INVENTION

A "content net" is a collection of Web documents having dependency relationships among their elements. It is assumed that dependency relationships among document elements in a content net are given representations that permit a computer-based interpretation and evaluation.

Elements which are involved in one or more dependency relationships in a content net are called "active elements". Active elements that do not depend on other elements are called "initial elements". Contents of an initial element are entered or updated by human users of the content net, or by application programs that are external to the content net such as database applications. Given a content net, a computer-implemented system which updates all elements that directly or indirectly depend on one or more updated initial element is called a "content net update propagation system".

Given a content net, it is assumed that all of its active elements are given some form of unique identifiers. One possible form of such identifiers is, for instance, a path in the tree structure of a Web document from its root node to the active element to be identified. Such paths can be represented in languages under Web standardization effort such as XPath or XPointers. Another form of identifiers for active elements can be realized via values of a designated attribute which is given to active elements. For the sake of a concrete description of the present invention, we use the latter, attribute-based identification using the "Cname" attribute, but actual implementations of such identifiers are not limited to this form. Values of the Cname attribute are called "content variables". In the example of FIG. 1, the element "FatherContactAtwork" is given the content variable "C1" via its open tag <FatherContactAtWork Cname="C1">. Dependency relationships in a content net can then be represented as relationships among such content variables (or other forms of identifiers for active elements).

Figure 10:
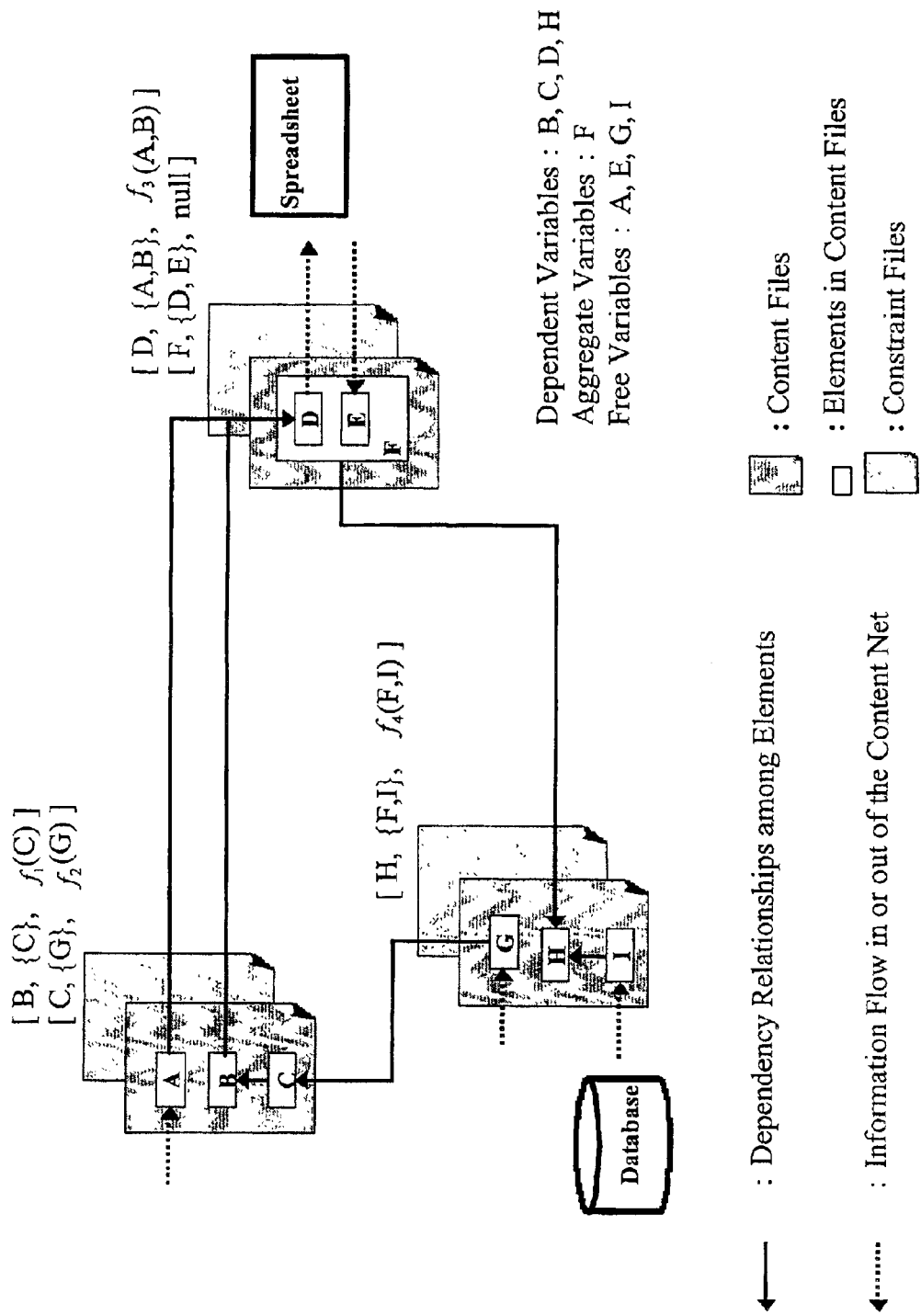
FIG. 10 is an example of a content net that is given as a collection of pairs of a content file and its constraint file.

FIG. 9 shows an example of a content net with dependency relationships which are defined via element identifiers (not necessarily implemented as content variables). In the example shown in FIG. 9, identifiers for active elements are shown as "a.x", "a.y", etc, and dependency relationships among the active elements are defined functionally via functions $F_1$ through $F_8$ and element identifiers. In FIG. 9, there is only one constraint file containing all of the dependency relationships. However, this is only one specific form of representing dependency relationships, and it is also possible to allocate dependency relationships to multiple constraint files. For instance, each content file can be paired with a constraint file, which defines dependency relationships for the active elements in the paired content file. FIG. 10 illustrates content nets of this type. Yet another form of representation for dependency relationships may not have separate constraint files at all, and may capture dependency relationships directly in the content files themselves. Especially, when Web documents representing information contents are written in XML, or when those Web documents permit XML-based tagging at least partially, mixing dependency relationships with contents in content files can be done rather easily.

For the purpose of propagating updates through dependency chains of active elements, the constraint file in the example of FIG. 9 can actually be a computer program that is written in a programming language such as Java, or it is also possible to develop a system that can interpret and execute dependency specifications in the constraint file. Then, functions such as $F_1$ can be processed by a programming language or by such a system. In the latter case, it is also possible to process such functions via external application software as long as the following holds:

A read-write interface can be developed between the application software and the Web documents.

The read-write interface including initiation of the application software can be controlled via a program which is external to the application software.

When functions such as $F_1$ are implemented via external application software, the content net update propagation system can serve as a system for coordinating various applications through the exchange of messages that are represented as elements of Web documents.

The content net update propagation system will now be described in further detail. In what follows, content variables will be used as preferred identifiers for active elements, and the implementation of a content net as a collection of pairs of a content file and its associated constraint file (as in FIG. 10) will be deployed, but this choice is only one form of implementation.

Suppose that a content variable C is assigned to an active element in a content file X. In this case, we say "C is declared in X", and call that active element a "C element". An active element can have another active element as its sub-element. Suppose an active element B is a sub-element of an active element A. If there are no other active elements between A and B (i.e., in the path from A down to B), we say that B is a direct, active sub-element of A.

Each dependency relationship among the content variables in a content net is defined in a "dependency clause". A dependency clause is represented in the following form, or in a form which is equivalent to this form:

$[C_0, \{C_1, C_2, \ldots, C_n\}, d]$, where $C_0, C_1, C_2, \ldots, C_n$ are all content variables. The intended meaning of such a dependency clause is that the content variable $C_0$ is defined in terms of the content variables $C_1, C_2, \ldots, C_n$, via the third term d of the clause. A dependency clause in which a content variable C is defined is called a "C-clause". A content net assumes that for each content variable, if there is a dependency clause defining that content variable, that dependency clause is the only clause defining the variable. A content variable having no dependency clause defining the content variable is called a "free variable". Thus, a free variable corresponds to an initial element, which does not depend on other active elements, and the free variable serves as an interface to receive information from human users or applications which are external to the content net.

There are two types of dependency clauses: "functional dependency clauses" and "hierarchical dependency clauses". Functional dependency clauses must satisfy the following:

The third term "d" of the clause is a functional expression consisting of content variables $C_1, C_2, \ldots, C_n$, MathML operators, and external operators that can be referenced in MathML.

Different content variables in the first and second terms of a dependency clause can be declared in different content files. However, for any content variable $C_i$ in the second term of the clause, there is no sub-element relationship between $C_0$ and $C_i$.

Hierarchical dependency clauses, on the other hand, must satisfy the following:

The third term "d" of the dependency clause represents the null operation, which may be denoted by a designated symbol such as "null".

$C_0$ is declared in some content file, in which a $C_1$-element, $C_2$-element, . . . and $C_n$-element are direct active sub-elements of the $C_0$-element and they are the only direct active sub-elements of $C_0$-element.

The content variable in the first term of a functional dependency clause is called a "functional dependent variable" or simply a "dependent variable". The content variable in the first term of a hierarchical dependency clause is called an "aggregate variable". Suppose that a content variable C is defined in some dependency clause. By the assumption above, we have only one C-clause. Thus, C may be either a dependent variable or an aggregate variable, but not both at the same time. Also, if the C-element has active sub-elements, C must be an aggregate variable that is defined in a hierarchical dependency clause. Thus, a dependent variable has no active sub-elements.

Hierarchical dependency clauses are determined by hierarchical relationships from among active elements in a content file. In contrast, functional dependency clauses are defined directly in constraint files. In order to illustrate the functional dependency, we will introduce 3 content files in FIGS. 2, 3 and 4 (in addition to the content file in FIG. 1). Consider the following functional dependency clauses in the context of 4 content files in FIGS. 1, 2, 3, and 4:

[Z, {C2, H2}, C2+H2]
[W, {C1, H1}, buildTree(C1, H1)]

The first dependency clause [Z, {C2, H2}, C2+H2] is given in a constraint file (FIG. 6) that pairs with the "SatoBookkeeping" content file. The second dependency clause [W, {C1, H1}, buildTree (C1, H1)] is specified in the constraint file (FIG. 8) that corresponds to the "SatoTelephoneDirectory" content file.

The meaning of the dependency clause [Z, {C2, H2}, C2+H2] is that the content "10,000,000" that is denoted by C2 (FIG. 1) and the content "8,000,000" that is denoted by H2 (FIG. 2) are added together and that the resulting sum is the content of Z. Thus, once this dependency clause gets interpreted and executed according to its meaning as described above, the "SatoBookkeeping" content file will be updated as shown in FIG. 5. The actual mechanism of interpreting and executing dependency clauses will be described below.

The operator "buildTree" in the second dependency clause [W, {C1, H1}, buildTree(C1, H1)] is an example of an external operator that can be accessed in MathML. Its meaning in this example is to build a new tree by concatenating, under a new root node, existing trees that are denoted by C1 and H1 in that order. Accordingly, once this dependency clause gets interpreted and executed, the "SatoTelephoneDirectory" content file will be updated as shown in FIG. 7.

Given a content net, its "dependency graph" is a collection of all functional dependency clauses which are defined in the constraint files of the content net and the hierarchical dependency clauses that are given by hierarchical relationships of active elements in the content files of the net. The "dependency graph construction module" is a system module that, given a content net, computes its dependency graph by extracting all functional dependency clauses from the constraint files and all hierarchical dependency clauses from the content files (see FIG. 13). When a content variable A depends on a content variable B, which in turn depends on a content variable C in a dependency graph, we say A indirectly depends on C, or simply that A depends on C. Given a dependency graph, its "dependency matrix" identifies, for each content variable in the underlying content net, all content variables that directly or indirectly depend on that content variable. More specifically, if the number of content variables in a given content net is n in total, its dependency matrix can be represented as an n×n matrix that is indexed by the set of all content variables in the content net. In this case, given content variables $C_1$ and $C_2$, the matrix entry ($C_1$, $C_2$) indicates the presence or absence of the dependency relationship between the two content variables. Such a dependency matrix can be computed from a dependency graph through a known algorithm. The "dependency matrix construction module" is a system module that computes a dependency matrix, given a dependency graph (see FIG. 13). A dependency matrix can detect a cyclic dependency chain in which a content variable indirectly depends on itself. When a cyclic dependency chain exists, a system that propagates updates along dependency chains will be trapped in an infinite loop. The "cyclic dependency detection module" is a system module that detects and reports cyclic dependencies given a dependency matrix (see FIG. 13). Given a set of free variables, its "update candidate set" is a set of content variables that directly or indirectly depend on some variables in the set. The "candidate set generation module" is a system module that, given a set of free variables, computes its update candidate set. Free variables are clustered together whenever such free variables are intended to be updated together and belong to the same update scope. For instance, in an order-placing task, if different content variables are assigned to elements representing order items, order quantities and order dates, these content variables collectively represent a single unit of updates. Whenever such update scopes naturally exist, corresponding update candidate sets can be predetermined prior to the actual propagation of the updates. We will put together four system modules discussed above, namely, the dependency graph construction module, the dependency matrix construction module, the cyclic dependency detection module, and the candidate set generation module, and call such a module the "dependency structure analysis module".

An update request by the user of a content net consists of a set of free variables and an update content for each of these free variables. Given an update request, the dependency structure analysis module determines the update candidate set that corresponds to the set of free variables in the update request. The "update module" is a system module that, given an update candidate set, updates active elements which are associated with content variables in the update candidate set following the dependency structure of the candidate set. The update module can be implemented in a variety of ways, but two main types of methods are top-down methods and bottom-up methods. A top-down method can be realized via a known recursive algorithm. Given an update candidate set, a top-down method recursively searches for "update-ready" content variables, and whenever the top-down method finds such content variables, the top-down method updates the corresponding active elements. Here, a content variable C is said to be "update-ready" with respect to a set, say S, of content variables which have been already updated if such a content variable satisfies the following:

C directly depends on at least one variable in S;
Whenever C directly depends on a content variable D that is not in S, D does not depend on any variable in S (i.e., D is not affected by S).

Such top-down modules are relatively easy to implement, and they are probably reasonably efficient when dependency chains are shorter. When dependency chains are longer, pre-computing update-ready variables will be effective. Namely, we first identify the set of all update-ready content variables with respect to the set of free variables in the update request. We assign an "update rank", or simply "rank" 0 to the set of free variables in the request, and a rank 1 to the set of update-ready variables with respect to the set of free variables. Next, we identify the set of all update-ready variables, this time with respect to the set of all content variables with rank 1, and assign rank 2 to all update-ready variables which are newly identified. The update-ranking module is a system module that, given an update candidate set, computes ranks for all content variables in the set by repeatedly applying the procedure described above. The update-ranking module can efficiently compute update ranks by using a dependency matrix. In the example of FIG. 9, the update-ranking module will determine the following ranking of content variables:

Rank 0: a.x, c.y, d.z
Rank 1: d.x, d.y
Rank 2: b.y, c.x
Rank 3: b.z
Rank 4: a.z
Rank 5: a.y
Rank 6: b.x In FIG. 9, these ranks are indicated next to element identifiers. The update module mentioned previously can operate quite efficiently if the update module adopts a bottom-up method by starting with content variables with the lowest rank and working upward following the pre-established ranking of content variables. Furthermore, since content variables with the same rank do not depend on each other, they can be updated concurrently.

Figure 13:
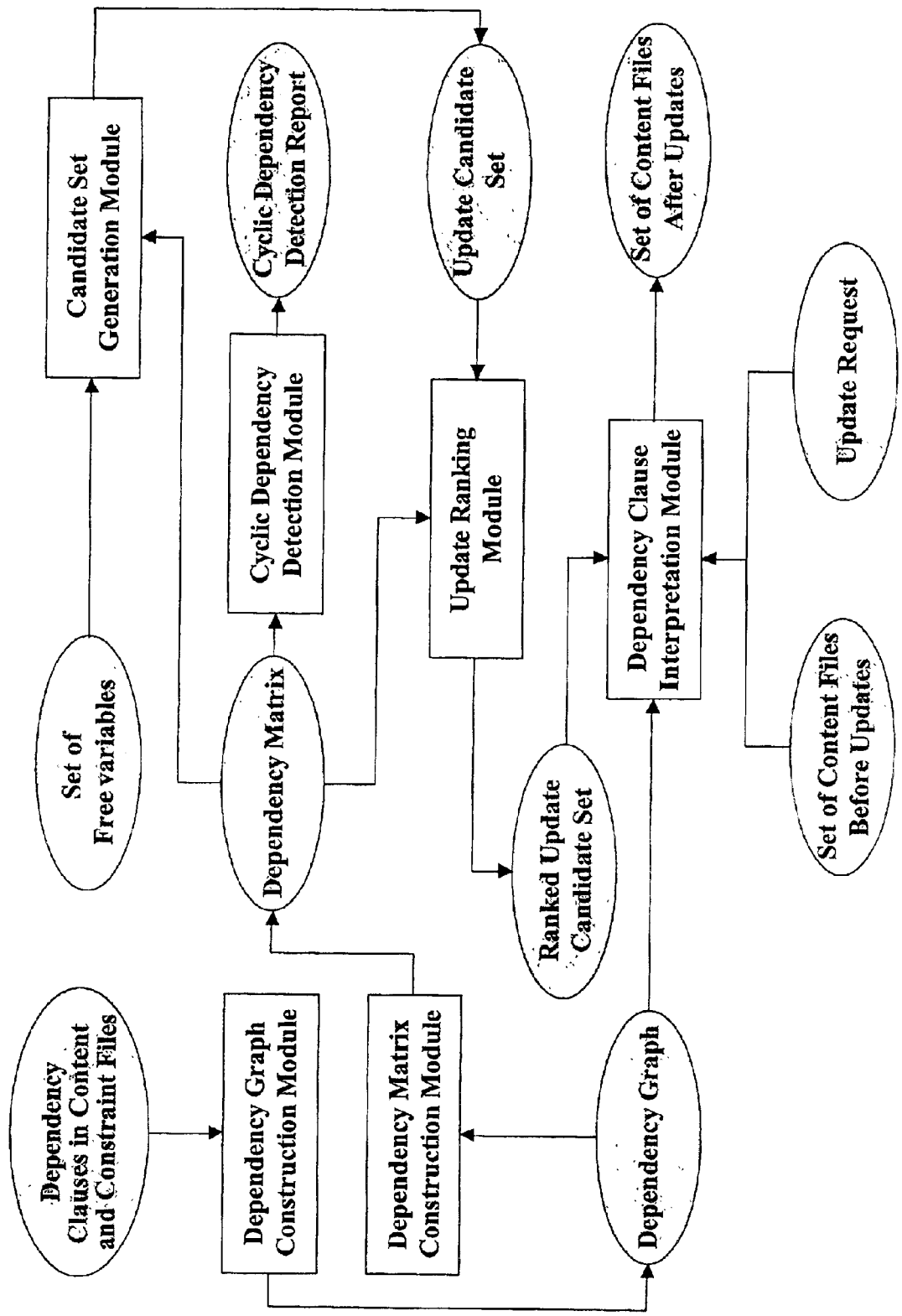
FIG. 13 shows a form of the content net update propagation system.

The "dependency clause interpretation module" is a part of the update module that, as update-ready content variables get determined, regardless of whether the determination is top-down or bottom-up, updates corresponding active elements by using relevant dependency clauses. Thus, a bottom-up method can be realized via the dependency clause interpretation module using the update-ranking module to find update-ready variables, whereas a top-down method can be built via the dependency clause interpretation module using a recursive search to find update-ready variables. FIG. 13 shows a form of the content net update propagation system using a bottom-up method. In FIG. 13, if we replace the update-ranking module with a module that recursively identifies update-ready variables, and if we replace a ranked update candidate set with a set of update-ready variables, we will have a form of the content net update propagation system based on a top-down method.

Figure 12:
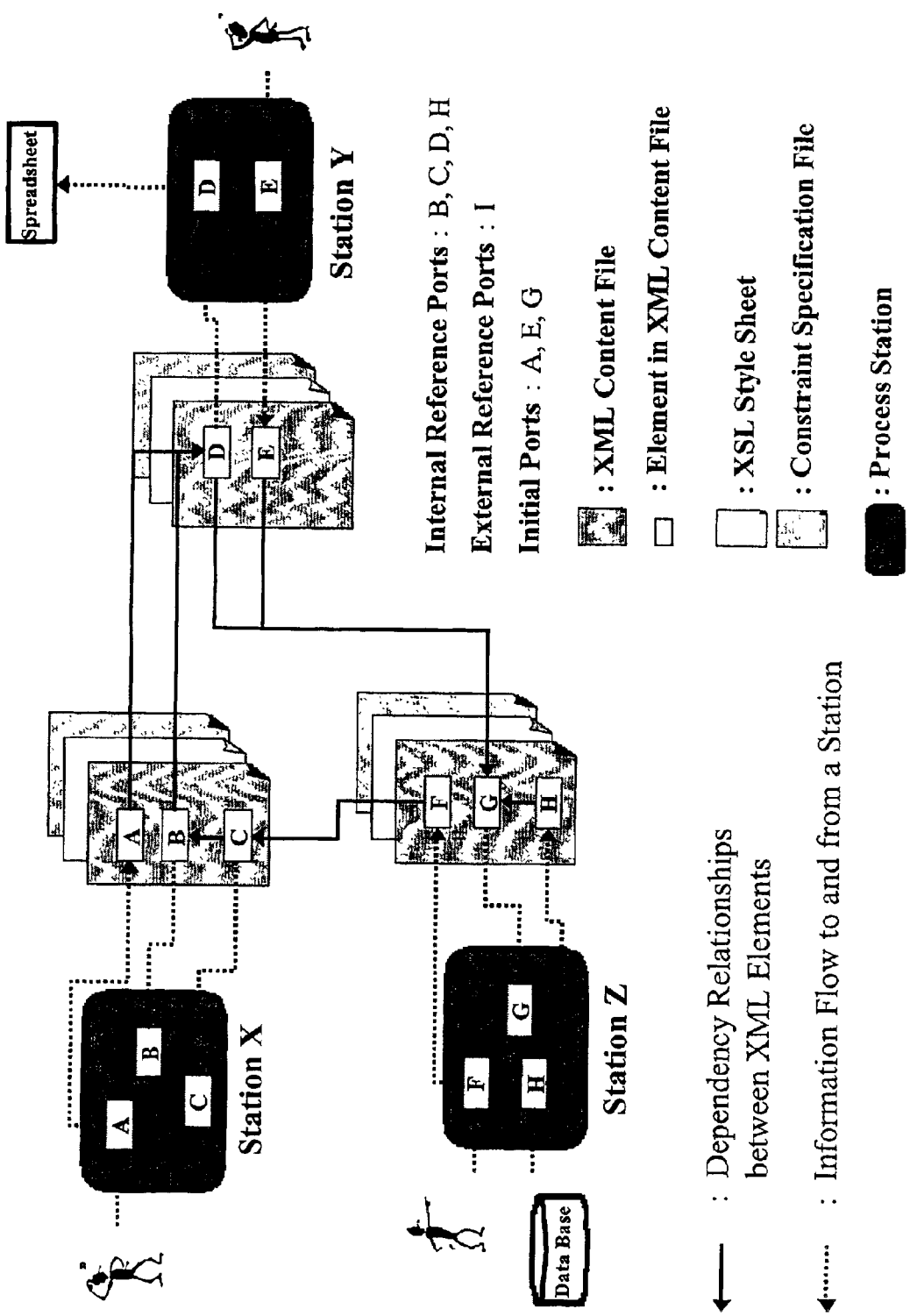
FIG. 12 is an example of a station net.

For each content file of a given content net, we assume a "style file" that defines a layout for this content file. We also assume that a content file and its associated style file are separate files. However, this is only one form of content nets, and it is possible to have a form of content nets where layout styles and contents are mixed in one file as in HTML documents. A "process station", or simply a "station", is a content file with a presentation layout that is separately defined via a style file (or inseparably mixed within the content file via a language such as HTML). A "process station net", or a "station net", is a network of stations where each station is associated with a content file of a base content net (see FIG. 12). In these definitions, we assume that the presentation layout respects intended structures and functions of process stations, which we will discuss next. We will then describe how elements of a content file map to components and the functions of the layout structure of the corresponding process station.

Figure 11:
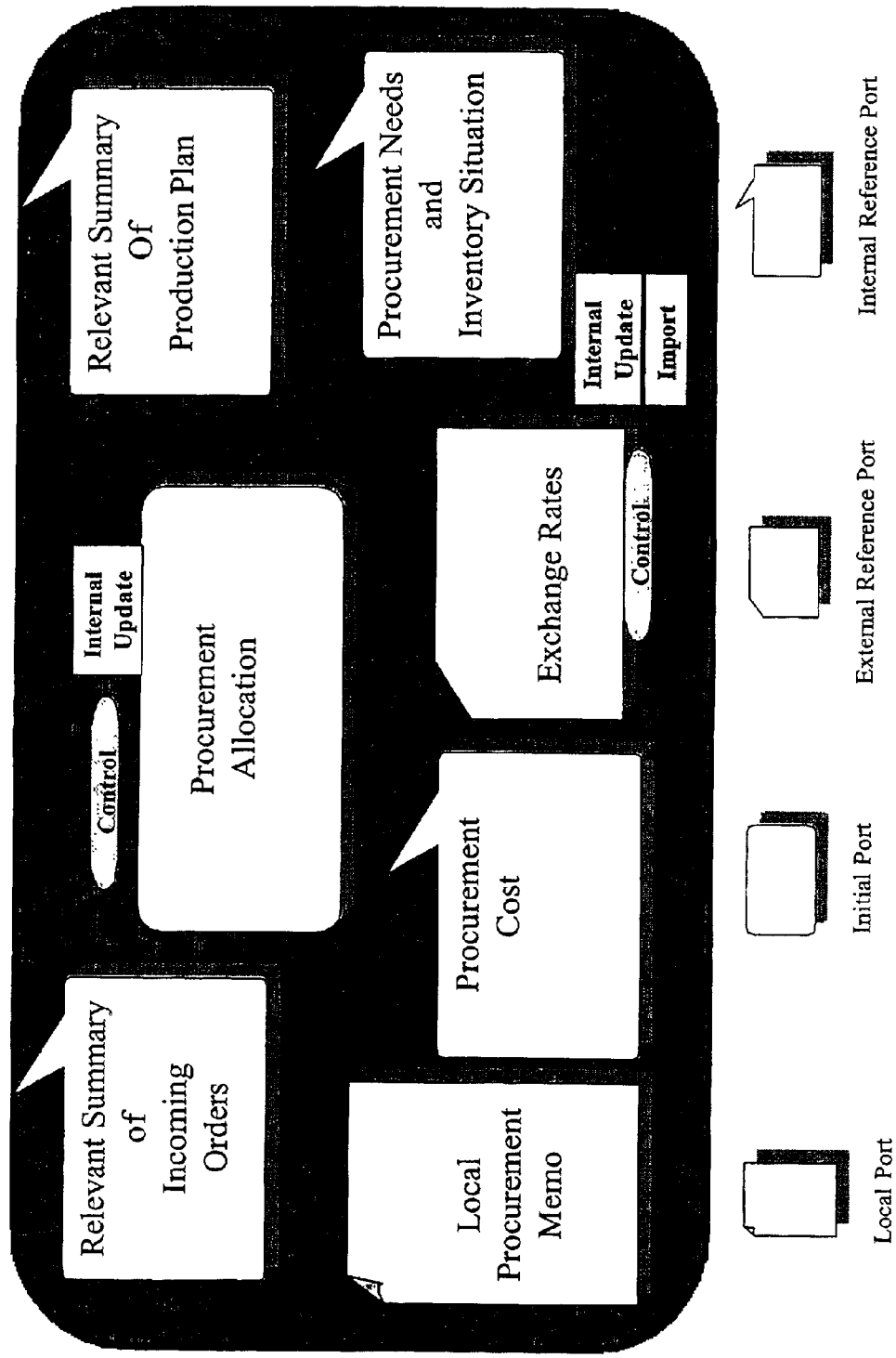
FIG. 11 is an example of a station.

Structurally, a station consists of one or more ports, which are of the following types (see FIG. 11):

Reference ports
  Internal reference ports: Ports for receiving reference information, via interpretation through dependency clauses, from other ports within the station net.
  External reference ports: Ports for receiving reference information, via interpretation through dependency clauses, from sources which are external to the station net.

Input ports
  Initial ports: Ports for submitting initial updates and triggering subsequent update propagation.
  Local ports: Ports for keeping information within the station for local use.

Each port can have one or more "control functions". Control functions are either basic functions or composite functions that are assembled from basic functions. Basic functions include the following:

Internal update: Update propagation throughout the content net following dependency chains which are given by dependency clauses.

Import: Moving information into the content net from external sources.

Export: Sending information to external destinations outside the content net.

In order to assemble composite functions from basic functions, stations provide some "control assemblers" including the following:

Sequential execution: denoted by symbol "|".
Concurrent execution: denoted by symbol "&".

Some examples of composite functions follow:

Import | Internal Update: Perform "Import" and then "Internal Update".

Internal Update & Export: Perform "Internal Update" and "Export" concurrently.

Import | (Internal Update & Export): Perform "Import", and then perform "Internal Update" and "Export" concurrently.

Furthermore, control functions, which can be basic or composite as described above, can have "control modes", which include the following:

Operator Control: Control functions with this mode can only be initiated by human users;

Program Control: Control functions with this mode are initiated by computer programs.

Given a content file, an element with a dependent variable is called an "internal reference element". A set of internal reference elements of a content file sharing the same set of initial elements as dependency sources may be mapped to an internal reference port of the corresponding station. In many cases, such a set of internal reference elements contains only a single element, and hence, a single internal reference element maps to an internal reference port. Elements in a content file with free variables are of two types, namely "initial elements" and "external reference elements". A set of initial elements of a content file within the same update scope will be mapped to a initial port of the corresponding station. In some cases, such a set of initial elements might contain only a single element. An external reference element will be mapped to an external reference port. The set of all non-active elements that are not sub-elements of an active element will be mapped to the local port of the station.

Given a content file, a corresponding style file can be constructed following the mappings described above. For the representation of style files, Web-standard languages such as XSL can be used. Some Web browsers support such style specification languages including XSL. If content files of a content net and their corresponding style files are given to such browsers, a network of process stations can be realized over the Web.

Whether style files are separate from content files or are mixed with content files as in HTML files, a network of process stations as port complexes can coordinate work processes via message passing based on the underlying content net update propagation system. Such a collection of networked stations will show the following characteristics and benefits:

Since a collection of related ports can be realized within the same Web document, the user, in moving between related ports, would not have to download and go back and forth between different Web documents. Also, since the layout of multiple ports can be organized as a layout of a single document, it is much easier to closely locate ports that are strongly related to each other in terms of contents and tasks.

Update propagation of information contents at various ports can be realized through a Web-implemented station net. Such a Web-based system will enable the timely coordination of human and computer-based tasks by the real-time dissemination of information contents which are properly customized to the needs of those tasks.

Typically, a station net contains multiple stations, and the station net supports the coordination of multiple tasks by multiple people. However, as a special case, a station net may contain only a single station. All previous definitions and descriptions related to station nets still apply to this special case. For instance, in the order-placing task discussed above, it is possible to have a station net consisting of a single "order-placing station" Such a station may have, as initial ports, a port for submitting credit card information, a port to enter order contents, or a port to enter search keys for browsing product catalogs. As internal reference ports corresponding to some of these initial ports, the station may have a port for placing the result of a credit card examination, a port for presenting a response to the placed order, and a port for showing the result of a requested, catalog search. In this case, the relationships between the initial ports and their corresponding internal reference ports may be captured computationally through dependency clauses. For instance, a program to process credit card information can be represented as a MathML external function (as defined by the user), in which case this function appears in the third term of the dependency clause that defines the content of the internal reference port for placing the result of the credit card examination. Moreover, by placing both the initial and reference ports which are related to credit card approval, the user of the order-placing station can receive the approval result in a port right next to the initial port in the same screen.

What is claimed is:

1. A computer-implemented system for managing a collection of mutually dependent information contents that are networked over the Web, said system comprising:
   a collection of Web documents, which are a content net, that comes with computer-executable representations of dependency relationships among elements of the Web documents;
   means for automatically propagating updates that are introduced in elements of the Web documents to all elements of the Web documents that depend on the updated elements;
   a dependency structure analysis module operable to
      given a set of updated activated elements, identify its update candidate set, which contains all active elements, or corresponding content variables, which depend on at least one of the active elements in the given set, and
      determine at least one of the presence and absence of cyclic dependencies among active elements in the Web documents in the content net;
   a module operable to, given an update candidate set, recursively update elements in the update candidate set;
   a station as at least one of a collection of ports and a port complex for interchanging information over the Web, said station being a browser-based presentation of a Web document representing information contents in a content net;
   a station net, which is a collection of said stations that are networked over the Web and which is accessible to human users in the Web environment, wherein each said station in the collection is derived from a Web document representing information contents in a designated content net;
   wherein said station comprises:
      internal reference ports operable to receive information from sources within said station net containing said station;
      external reference ports operable to receive information from applications including database applications outside said station net;
      initial ports operable to send information to other ports within said station net containing said station; and
      a local port operable to keep information within said station for local use.

2. The computer-implemented system according to claim 1, wherein at least one of said external, initial and local ports in said station are equipped with at least one of:
   control functions for update propagation within said entire station net;
   control functions for importing information from external applications including database applications;
   control functions for exporting information to external applications; and
   control functions which are obtained by at least sequential or concurrent compositions of said control functions above.

3. The computer-implemented system according to claim 2, wherein the control functions can operate in at least one:
   an operator control mode in which the control functions are initiated by human users; and
   a program control mode in which the control functions are initiated by computer programs.

4. The computer-implemented system according to claim 1, wherein at least one of content variables and corresponding elements of a content file map to ports of said station corresponding to the content file respecting the following constraints:
   at least one of said internal reference ports is associated with a set of content variables which depend on other content variables via functional dependency clauses;
   at least one of said initial ports is associated with a set of free variables;
   at least one of said external reference ports is associated with a single free variable; and
   said local port is associated with the set of all non-active elements which are not sub-elements of an active element.

5. The computer-implemented system according to claim 4, wherein a layout of each said station is specified in a Web-standard language including XSL separately from the content file of said station.

6. The computer-implemented system according to claim 2, wherein at least one content variables, and corresponding elements of a content file map to ports of said station corresponding to the content file by respecting the following constraints:

- at least one of said internal reference ports is associated with a set of content variables which depend on other content variables via functional dependency clauses;
- at least one of said initial ports is associated with a set of free variables;
- at least one of said external reference ports is associated with a single free variable; and
- said local port is associated with the set of all non-active elements which are not sub-elements of an active element.

7. The computer-implemented system according to claim 3, wherein at least one content variables and corresponding elements of a content file map to ports of said station corresponding to the content file by respecting the following constraints:

- at least one of said internal reference ports is associated with a set of content variables which depend on other content variables via functional dependency clauses;
- at least one of said initial ports is associated with a set of free variables;
- at least one of said external reference ports is associated with a single free variable; and
- said local port is associated with the set of all non-active elements which are not sub-elements of an active element.

* * * * *